US010920037B2

(12) United States Patent
Schulz et al.

(10) Patent No.: US 10,920,037 B2
(45) Date of Patent: Feb. 16, 2021

(54) THERMALLY CONDUCTIVE POLYMER RESIN COMPOSITION BASED ON STYRENICS WITH LOW DENSITY

(71) Applicant: INEOS STYROLUTION GROUP GMBH, Frankfurt am Main (DE)

(72) Inventors: Tobias Schulz, Cologne (DE); Norbert Niessner, Friedelsheim (DE); Gisbert Michels, Leverkusen (DE); Hans-Werner Schmidt, Bayreuth (DE); Tristan Kolb, Bayreuth (DE)

(73) Assignee: INEOS STYROLUTION GROUP GMBH, Frankfurt am Main (DE)

( * ) Notice: Subject to any disclaimer, the term of this patent is extended or adjusted under 35 U.S.C. 154(b) by 298 days.

(21) Appl. No.: 15/765,894

(22) PCT Filed: Oct. 6, 2016

(86) PCT No.: PCT/EP2016/073866
§ 371 (c)(1),
(2) Date: Apr. 4, 2018

(87) PCT Pub. No.: WO2017/060344
PCT Pub. Date: Apr. 13, 2017

(65) Prior Publication Data
US 2018/0312660 A1 Nov. 1, 2018

(30) Foreign Application Priority Data

Oct. 9, 2015 (EP) .................................... 15189141

(51) Int. Cl.
| | | |
|---|---|---|
| C08K 3/38 | (2006.01) | |
| C08K 3/34 | (2006.01) | |
| C08K 3/18 | (2006.01) | |
| C08K 3/04 | (2006.01) | |
| B29B 7/90 | (2006.01) | |
| B29C 45/00 | (2006.01) | |
| B29K 55/02 | (2006.01) | |
| B29K 509/04 | (2006.01) | |

(52) U.S. Cl.
CPC .................. *C08K 3/38* (2013.01); *B29B 7/90* (2013.01); *B29C 45/0001* (2013.01); *B29C 45/0013* (2013.01); *C08K 3/04* (2013.01); *C08K 3/18* (2013.01); *C08K 3/34* (2013.01); *B29K 2055/02* (2013.01); *B29K 2509/04* (2013.01); *C08K 2003/385* (2013.01)

(58) Field of Classification Search
CPC ...................................................... C08K 3/38
See application file for complete search history.

(56) References Cited

U.S. PATENT DOCUMENTS

| | | | |
|---|---|---|---|
| 3,553,167 | A | 1/1971 | Hermann et al. |
| 4,075,173 | A | 2/1978 | Maruyama et al. |
| 4,156,069 | A | 5/1979 | Prevorsek et al. |
| 4,311,823 | A | 1/1982 | Imai et al. |
| 4,334,053 | A | 6/1982 | Freitag et al. |
| 4,982,014 | A | 1/1991 | Freitag et al. |
| 5,434,218 | A | 7/1995 | Baumgartner et al. |
| 5,760,134 | A | 6/1998 | Guntherberg et al. |
| 6,323,279 | B1 | 11/2001 | Guntherberg et al. |
| 6,579,937 | B1 | 6/2003 | Guntherberg et al. |
| 2002/0058743 | A1 | 5/2002 | Tobita et al. |
| 2008/0153959 | A1 | 6/2008 | Charati et al. |
| 2008/0277619 | A1 | 11/2008 | Matsumoto et al. |
| 2012/0157600 | A1 | 6/2012 | Saga |
| 2014/0080954 | A1 | 3/2014 | Raman et al. |
| 2014/0240989 | A1 | 8/2014 | Hardikar et al. |

FOREIGN PATENT DOCUMENTS

| | | |
|---|---|---|
| CA | 1173998 A | 9/1984 |
| DE | 1495626 B1 | 6/1971 |
| DE | 2232877 A1 | 1/1974 |
| DE | 2703376 A1 | 8/1977 |
| DE | 2714544 A1 | 10/1977 |
| DE | 3000610 A1 | 7/1980 |
| DE | 2940024 A1 | 4/1981 |
| DE | 3007934 A1 | 9/1981 |
| DE | 3832396 A1 | 2/1990 |
| EP | 2537895 A1 | 12/2012 |
| KR | 20090001068 A | 1/2009 |
| KR | 20100061082 A | 6/2010 |
| KR | 20130088251 A | 8/2013 |
| WO | 2014/202649 A1 | 12/2014 |

OTHER PUBLICATIONS

International Preliminary Report on Patentability in International Application No. PCT/EP2016/073866, dated Nov. 22, 2017.

*Primary Examiner* — Larry W Thrower
(74) *Attorney, Agent, or Firm* — J.A. Lindeman & Co. PLLC

(57) ABSTRACT

Thermally conductive polymer (TCP) resin compositions are described, comprising components (X) and (Y): 90 to 99.9% component (X) comprising components (I) and (II): 60 to 85% matrix polymer (I) comprising styrenic polymers (F) selected from: ABS resins, ASA resins, and elastomeric block copolymers of the structure $(S-(B/S))_n-S$; 15 to 40% thermally conductive filler material (II) ($D_{50}$ 1 to 200 μm), consisting of a ceramic material and/or graphite; 0.1 to 10% chemical foaming agent (Y). Shaped articles made thereof can be used for automotive applications, as a heat sink for high performance electronics, LED sockets or electrical and electronic housings.

11 Claims, No Drawings

THERMALLY CONDUCTIVE POLYMER RESIN COMPOSITION BASED ON STYRENICS WITH LOW DENSITY

The present invention deals with lightweight thermoplastic polymer resin compositions having a high thermal conductivity. The thermally conductive polymer (TCP) resin composition comprises a matrix polymer based on styrenic polymers (styrenics). Further aspects of the invention are a process for the preparation of the TCP resin composition, shaped articles comprising the TCP-composition and the use of the TCP-composition for several applications such as automotive applications or as a heat sink for high performance electronics or for LED sockets or electrical, toys, helmet inlays and electronic housings.

Many electrical and electronic devices include a light emitting package in a structure such as a mold frame, a chassis structure or a metal bottom cover. Because of their excellent mechanical properties, thermoplastic polymeric resin compositions are used to manufacture articles of various sizes and shapes, including without limitation chassis components, and housings. In many cases, because of the design flexibility and their low cost, polymer resin compositions have replaced metal in these applications. However, many of these applications require that the parts be in the vicinity of or in contact with heat sources such as electrical lights. It is therefore desirable to form these parts from materials that are sufficiently thermally conductive to dissipate the heat generated. In an attempt to improve thermal conductive characteristics, it has been the conventional practice to add thermally conductive materials to thermoplastic compositions.

WO 2014/202649 discloses thermally conductive polymer/boron nitride compounds which comprise a thermoplastic polymer, boron nitride agglomerate, a reinforcing filler and optionally at least one further thermally conductive filler selected from powdered metal, carbon in the form of graphite, and ceramic fillers and mineral fillers. As thermoplastic polymer polyamide is preferably used, thermoplastic polymers made from vinylaromatic monomers are not explicitly mentioned. A combination of polyamide 6, boron nitride hybride flakes, aluminosilicate and glass fibers is most preferred.

KR-A-20100061082 discloses a thermally conductive polymer composition comprising 56-64 vol.-% ceramic filler particles and 0.9-1 vol.-% multi-walled carbon nanotube particles, each based on the volume of the polymer resin. The polymer resin having a low viscosity is an epoxy-, phenol- or polyvinylidene fluoride resin.

US-A-2012/0157600 describes a molded thermoplastic article comprising a thermoplastic polymer, a thermally conductive filler and carbon black powder.

As thermally conductive fillers a variety of flakes and fibers composed of oxides, nitrides, metals and carbon is mentioned, graphite being in particular preferable. Among the suitable thermoplastic polymers syndiotactic polystyrene is listed, but polyesters and polyamides are preferred. The composition is used for motor housings, lamp housings and electrical and electronical housings.

KR-A-20130088251 deals with a thermally conductive material comprising a thermoplastic resin selected from polyolefins, polyamides, polybutyleneterephthalates, acrylonitrile-butadiene-styrene copolymers, polycarbonates, polyesters, polyphenylenesulfides and thermoplastic elastomers, and graphite and/or boriding nitrogen as thermoplastic conductive filler. Preferably as thermoplastic resins PP, PA6 or PBT are used in combination with expanded graphite or boriding nitrogen, optionally in combination with low amounts of carbon multi wall nanotubes.

KR-A-20090001068 discloses a thermally conductive thermoplastic resin composition comprising 100.0 parts by weight of a base resin and 0.1-30 parts by weight of a thermal conductive additive. The base resin comprises a grafted acrylonitrile-styrene-butadiene (ABS) copolymer resin (A) and a styrene-acrylonitrile (SAN) copolymer (B). The thermally conductive additive is a low melting point metal, a ceramic fiber, in particular alumina fiber, or their mixture.

US-A-2002/0058743 discloses a thermally conductive polymer composition comprising a polymer matrix, preferably made from a thermoplastic resin or thermoplastic elastomer, and graphitized carbon fibers and optionally a thermally conductive filler that is electrically insulative (e.g. BN, natural graphite, SiC). In a long list of suitable resins inter alia styrene acrylonitrile copolymer, ABS resin, and styrene-butadiene block copolymers are listed. One composition contains a styrene thermoplastic elastomer, graphitized carbon fibers, boron nitride and aluminum hydroxide.

US-A-2014/0240989 describes thermally conductive polymers comprising a thermoplastic polymer and a thermally conductive material such as AlN, BN, MgSiN$_2$, SiC and/or graphite. In a long list of suitable polymers inter alia polystyrenes and ABS and blends of ABS are mentioned, polyamides are in particular preferred.

The afore-mentioned TCPs are highly filled thermoplastic resin compositions with a high density due to the filler material such as metals or ceramics with higher densities.

Moreover many of the afore-mentioned currently available thermally conductive thermoplastic resin compositions are often difficult to process in particular by injection molding due to high shrinkage and often show minor surface quality.

Thermally conductive materials with a low density are highly desired in order to construct a light weight heat sink for high performance electronics or LED sockets or for automotive applications. Furthermore it is desired that such a lightweight TCP material shows a high gloss surface, a good processability and a high degree of freedom for shaping and coloring, being in particular suitable for injection molding. Therefore, it is an object of the invention to provide a thermally conductive polymer resin composition having the afore-mentioned properties.

It was surprisingly found that the problem mentioned above can be solved by the TCP resin composition according to the claims.

One aspect of the invention is a thermally conductive polymer (TCP) resin composition comprising (or consisting of) components (X) and (Y):

90 to 99.9% by weight of component (X) which is a composition comprising (or consisting of) components (I) and (II):

60 to 85%, preferably 65 to 80%, by volume of at least one matrix polymer (I) as component (I) comprising styrenic polymers (I') selected from the group consisting of: ABS (acrylonitrile-butadiene-styrene) resins, ASA (acrylonitrile-styrene-acrylate) resins, and elastomeric block copolymers of the structure

where S is a vinylaromatic block forming a hard phase, (B/S) is a random copolymer block of vinylaromatic monomer and of a conjugated diene forming a soft phase, and n are natural numbers from 1 to 10, wherein the elastomeric block copolymer has a monomer composition comprising from 25 to 60% by weight (based on the elastomeric block copolymer) of diene and from 75 to 40% by weight (based on the elastomeric block copolymer) of vinylaromatic compound, the glass transition temperature Tg of block S is above 25° C. and that of block (B/S) is below 25° C., and the proportion of the hard phase in the elastomeric block copolymer is from 5 to 40% by weight and the relative amount of 1,2 linkages of the polydiene, based on the sum of 1,2- and 1,4-cis/trans-linkages, is less than 15%;

15 to 40%, preferably 20 to 35% by volume of at least one thermally conductive filler material (II) as component (II) having a weight median particle diameter ($D_{50}$) of from 1 to 200 μm, which consists of at least one a ceramic material and/or graphite;

wherein the sum of components (I) and (II) totals 100% by volume; and 0.1 to 10% by weight of at least one chemical foaming agent as component (Y); wherein the sum of components (X) and (Y) totals 100% by weight.

In a cumulative particle size distribution the ordinate represents the cumulative size distribution from 0% to 100% and the abscissa represents the particle size. The particle size corresponding to an ordinate value of 50% is called $D_{50}$.

The weight median particle size $D_{50}$ is the diameter which divides the population exactly into two equal parts. 50% by weight of the particles are larger than the median particle size $D_{50}$ and 50% by weight are smaller.

The particle sizes of component (II) can be measured using mesh analysis (e.g. Retsch AS 200 jet), Transmission Electron Microscopy (TEM), dynamic image analysis (e.g. Retsch Camsizer XT) and/or laser light scattering (e.g. Horiba LA-300).

In principle, the TCP resin composition can optionally comprise at least one further common additive and/or auxiliary as component (Z). Component (Z) is, if present, different from components (I), (II) and (Y). Said additives and/or auxiliaries (Z) may optionally present in the inventive polymer blend in low amounts, such as 0.1 to 5% by weight, preferably 0.1 to 3% by weight, based on the entire resin composition.

Suitable further additives and/or auxiliaries (Z) are such as common plastic processing aids, plasticizers, waxes, antioxidants, mineral oil, silicone oil, heat- and/or UV-stabilizers, flame-retardants, dyes and pigments, in particular plastic processing aids such as antioxidant agents and lubricants. Often pigments are added.

Preferably the afore-mentioned inventive TCP resin composition does not comprise further additives and/or auxiliaries (Z).

The TCP resin composition generally has a thermal conductivity κ of more than 0.4 W/m·K, preferably more than 0.5 W/m·K, more preferably more than 0.7 W/m·K, most preferred more than 0.9 W/m·K.

The thermal conductivity is defined as $\kappa = \alpha \cdot c_p \cdot \rho$ and is determined as follows:

thermal diffusivity α: determined by Laser flash analysis (XFA 500 XenonFlash apparatus (Linseis) with an InSb infrared detector)

specific heat $c_p$ is determined by DSC (TA Instruments Q1000 DSC), ASTM E1269 density ρ is determined by Buoyancy Balance (Mettler Toledo AG245)

All cited standards for any measurement methods refer to the current issue of the cited standard valid at the priority date.

Component (X)

Component (X) is used in amounts of from preferably 95 to 99.5%, more preferably 97 to 99.0%, most preferably 97.5 to 98.5% by weight, based on components (X) and (Y).

Component (I)

Suitable components (I) or matrix polymers (I) comprise (consist of) at least one styrenic polymer (I') selected from the group consisting of: ABS (acrylonitrile-butadiene-styrene) resins, ASA (acrylonitrile-styrene-acrylate) resins, and the above-mentioned elastomeric block copolymers of the structure $(S—(B/S))_n$—S.

Additionally the matrix polymer (I) can optionally comprise (consist of) at least one further thermoplastic polymer (I'') selected from the group consisting of: polycarbonates and polyamides.

Preferably the matrix polymer (I) comprises or consists of one styrenic polymer (I') optionally in a mixture with one of said further thermoplastic polymers (I'').

If the matrix polymer (I) comprises a further thermoplastic polymer (I''), the styrenic polymer (I') is preferably an ABS resin or ASA resin.

More preferably the matrix polymer (I) comprises or consists of at least one—preferably exactly one—: ABS resin, ASA resin, elastomeric block copolymers of the structure $(A-(B/A))_n$-A, blend of ABS resin with polycarbonate (PC), blend of ABS resin with polyimide (PA), blend of ASA resin with polycarbonate (PC), or blend of ASA resin with polyamide (PA).

The afore-mentioned term "blend" means a mixture of one or more, preferably one, of the styrenic polymers (I') and one or more, preferably one, of the further thermoplastic polymers (I''). The blend may be obtained by combining said polymers (I') and (I'') using any melt-mixing method. Preferably said polymers (I') and (I'') are used as a ready mix blend of the matrix polymer (I) which may then be used for the manufacture of the inventive TCP resin composition. Alternatively for the manufacture of the inventive TCP resin composition said polymers (I') and (I'') can be used individually and may be added simultaneously or successively to a compounder to form a melt-mixed blend of the matrix polymer (I).

According to a first preferred embodiment the matrix polymer (I) is an ABS resin.

According to a second preferred embodiment the matrix polymer (I) is an ASA resin.

According to a third preferred embodiment the matrix polymer (I) is an elastomeric block copolymer of the structure $(A-(B/A))_n$-A.

According to a fourth preferred embodiment the matrix polymer (I) is a blend of an ABS resin with polycarbonate.

According to a fifth preferred embodiment the matrix polymer (I) is a blend of an ABS resin with polyamide.

According to a sixth preferred embodiment the matrix polymer (I) is a blend of an ASA resin with polycarbonate.

According to a seventh preferred embodiment the matrix polymer (I) is a blend of an ASA resin with polyamide.

The afore-mentioned matrix polymers (I) are commonly known to a person skilled in the art and are commercially available. Typical examples of suitable commercially available products are such as Terluran® GP22 (ABS); Terluran HI-10 (ABS); Luran® S 797 (ASA); Luran S 778T (ASA); Luran S 757 (ASA); Terblend® N NM-21 EF (ABS/PA); Terblend S NM-31 (ASA/PA); Luran S KR2864C (ASA/PC), Novodur® P2H-AT (ABS), Novodur Ultra (ABS/PC) and Styroflex® 2G66 (styrenic block copolymer (SBC)) all of which are obtainable from Styrolution company (Frankfurt, Germany).

Among the afore-mentioned products Terluran® GP22, Terluran® HI-10 Terblend® N NM-21 EF and/or Styroflex® 2G66 is preferably used as matrix polymer (I). More preferred as matrix polymer (I) is Terluran® HI-10, Terblend® N NM-21 EF and/or Styroflex® 2G66. Each of the afore-mentioned products can be used in mixture with each other or, preferably, alone.

Suitable ABS resins used as styrenic polymer (I') comprise at least one, preferably one, graft copolymer (I'-1) of a diene-based rubber and at least one, preferably one, rubber free vinyl copolymer (I'-2).

The graft copolymer (I'-1) is based on a diene-rubber, in particular a butadiene rubber, upon which a mixture of at least one vinylaromatic monomer, in particular styrene, and acrylonitrile and optionally further monoethylenically unsaturated monomers is grafted.

The rubber free vinyl copolymer (I'-2) is in particular a copolymer made from at least one, preferably one vinylaromatic monomer such as styrene or alpha methyl styrene, and acrylonitrile and optionally an additional monoethylenically unsaturated monomer.

The rubber free copolymer (I'-2) is preferably a copolymer made from styrene and acrylonitrile (SAN-copolymer) or a copolymer made from alpha methyl styrene and acrylonitrile (AMSAN-copolymer).

The graft copolymer (I'-1) is usually embedded in a matrix made from the rubber free vinyl copolymer (I'-2).

An ABS resin (I') comprising (or consisting of) an ABS graft copolymer (I'-1) and a styrene-acrylonitrile (SAN) copolymer (I'-2) is preferred. Such an ABS resin (I') is commercially available e.g. from Styrolution company as Terluran® GP22 (ABS) and Terluran HI-10 (ABS).

Preferred SAN-copolymers or AMSAN-copolymers (I'-2) comprise (consist of) generally 18 to 35 wt.-%, preferably 20 to 32 wt.-%, particular preferably 22 to 30 wt.-% acryloni-*trite* (AN), and 82 to 65 wt.-%, preferably 80 to 68 wt.-%, particular preferably 78 to 70 wt.-% styrene (S) or alpha methyl styrene, wherein the sum of the amounts of styrene or alpha methyl styrene and acrylonitrile totals 100 wt.-%.

Said SAN copolymers (I'-2) are also known and commercially available as for example Luran® 358 N (VLM); Luran 251000, Luran 2580 from Styrolution company.

Said AMSAN copolymers (I'-2) are commercially available as for example Luran HH-120 from Styrolution company.

According to the invention ABS resins (I') as herein before and hereinafter described are preferred which comprise (consist of) from 5 to 80%, preferably from 15 to 60%, particularly preferably from 35 to 55%, most preferably 40 to 50% by weight, based on the total of components (I') by weight of a graft polymer (I'-1) and from 20 to 95%, preferably from 40 to 85%, particularly preferably from 45 to 65%, most preferably 50 to 60% by weight by weight of a rubber free vinyl copolymer (I'-2).

In particular preferred is an ABS resin (I') comprising components (I'-1) and (I'-2),
(I'-1) from 5 to 80% by weight, based on (I'), of a graft polymer (I'-1) having monomodal or, preferred, bimodal particle size distribution made from,
a1) 40 to 90% by weight of an elastomeric particulate graft base a1), obtained by polymerization of, based on a1),
a11) from 70 to 100% by weight of at least one conjugated diene, in particular butadiene,
a12) from 0 to 30% by weight of at least one other monoethylenically unsaturated monomer and a13) from 0 to 10% by weight of at least one polyfunctional, crosslinking monomer and
a2) from 10 to 60% by weight of a graft a2) made from, based on a2),
a21) from 65 to 95% by weight of at least one vinylaromatic monomer, in particular styrene,
a22) from 5 to 35% by weight of acrylonitrile,
a23) from 0 to 30% by weight of at least one other monoethylenically unsaturated monomer, and
a24) from 0 to 10% by weight of at least one polyfunctional, crosslinking monomer and
(I'-2) from 20 to 95% by weight of a thermoplastic polymer (I'-2) having a viscosity number VN (determined according to DIN 53726 at 25° C., 0.5% by weight in dimethylformamide) of from 50 to 120 ml/g, made from, based on (I'-2),
a21) from 69 to 81% by weight of at least one vinylaromatic monomer, in particular styrene,
a22) from 19 to 31% by weight of acrylonitrile, and
a23) from 0 to 12% by weight of at least one other monoethylenically unsaturated monomer.

Such preferred ABS resins are described in U.S. Pat. No. 6,323,279.

Graft copolymers (IA) can be prepared by known polymerization techniques, such as solution or bulk polymerization or emulsion polymerization.

A suitable process for the preparation of graft copolymers (IA) by emulsion polymerization is disclosed in detail in U.S. Pat. No. 6,323,279. Furthermore it is referred to U.S. Pat. No. 5,434,218 which discloses a suitable process for the preparation of graft copolymers (IA) whose rubber phases are prepared exclusively by solution or bulk polymerization.

The graft copolymer (IA) is then mixed with copolymer (I'-2) by usual methods. The mixing apparatuses used are those known to the person skilled in the art.

Components (I'-1) and (I'-2) may be mixed, for example, by extruding, kneading or rolling them together.

Suitable ASA resins used as styrenic polymer (I') comprise at least one, preferably one, graft copolymer (I'-3) of an acrylate-based rubber and at least one, preferably one rubber free vinyl copolymer (I'-2) as defined above.

The graft copolymer (I'-3) is based on an acrylate rubber, in particular a butyl acrylate rubber, upon which a mixture of at least one vinylaromatic monomer, in particular styrene, and acrylonitrile and optionally further monoethylenically unsaturated monomers is grafted.

The graft copolymer (I'-3) is usually embedded in a matrix made from the rubber free vinyl copolymer (I'-2).

An ASA resin (I'), comprising (consisting of) an ASA graft copolymer (I'-3) and a styrene-acrylonitrile (SAN) copolymer (I'-2) is very particular preferred and is commercially available e.g. from Styrolution company as Luran® S 797; Luran S 777 K and Luran S 757.

Furthermore preferred are ASA resins (I') comprising (consisting of) a graft copolymer (I'-3) and an alpha methyl styrene-acrylonitrile (AMSAN) copolymer (I'-2) which are commercially available e.g. from Styrolution company as Luran S 778 T.

Preferably the ASA resins (I') comprise (consist of) 29 to 46 wt.-% graft copolymer (I'-3) and 54 to 71 wt.-% rubber free vinyl copolymer (I'-2), wherein the sum of components (I'-3) and (I'-2) totals 100% by weight.

A preferred ASA graft copolymer (I'-3) is built up from $(a_3)$ 30 to 90% by weight, based on (I'-3), of a graft base $(a_3)$ with a glass transition temperature $(T_g)$ below $-10°$ C. made from ($a_{31}$) an at least partially crosslinked acrylate polymer formed from
($a_{311}$) 50 to 99.9% by weight, based on ($a_{31}$), of at least one $C_1$-$C_{10}$-alkyl acrylate, in particular n-butylacrylate,
($a_{312}$) 0.1 to 5% by weight, based on ($a_{31}$), of at least one polyfunctional crosslinking monomer and
($a_{313}$) 0 to 49.9% by weight, based on ($a_{31}$), of a further monomer which is copolymerizable with ($a_{111}$) selected from the group consisting of the vinyl $C_1$-$C_8$-alkyl ethers, butadiene, isoprene, styrene, acrylonitrile and methacrylonitrile, and/or methyl methacrylate
($a_4$) from 10 to 70% by weight, based on (I'), of a graft ($a_4$) with a ($T_g$) above 50° C., grafted onto the graft base ($a_3$) and built up from
($a_{41}$) 50 to 95% by weight, based on ($a_4$), of at least one vinylaromatic monomer, in particular styrene,
($a_{42}$) 5 to 50% by weight, based on ($a_4$), of at least one polar, copolymerizable comonomer selected from the group consisting of acrylonitrile, methacrylonitrile, $C_1$-$C_4$-alkyl (meth)acrylates, maleic anhydride and maleimides, and (meth)acrylamide, and/or vinyl $C_1$-$C_8$-alkyl ethers, or a mixture of these, in particular acrylonitrile.

Preferably said graft copolymer (I'-3) is an ASA graft copolymer, made from an at least partially crosslinked n-butyl acrylate rubber upon which styrene and acrylonitrile are grafted.

Graft copolymers (I'-3) can be prepared by known polymerization techniques, such as solution or bulk polymerization or emulsion polymerization. Suitable graft copolymers (I'-3) and their preparation are disclosed in for example U.S. Pat. Nos. 5,760,134 and 6,579,937 to which is in particular referred.

Polycarbonates which are suitable for the afore-mentioned blends of ABS- or ASA-resins are described in EP-A 2537895 in paragraphs 22 to 32 to which is in particular referred.

As polycarbonate one or more, preferably one or two, more preferably one aromatic polycarbonates can be used.

According to the invention the term polycarbonate includes for example polycondensation products, for example aromatic polycarbonates, aromatic polyester carbonates.

Aromatic polycarbonates and/or aromatic polyester carbonates which are suitable according to the invention are known from the literature or may be prepared by processes known from the literature (for the preparation of aromatic polycarbonates see, for example, Schnell, "Chemistry and Physics of Polycarbonates", Interscience Publishers, 1964 and DE-AS 1 495 626, DE-A 2 232 877, DE-A 2 703 376, DE-A 2 714 544, DE-A 3 000 610 and DE-A 3 832 396; for the preparation of aromatic polyester carbonates e.g. DE-A 3 077 934). The preparation of aromatic polycarbonates is carried out e.g. by reaction of diphenols with carbonic acid halides, preferably phosgene, and/or with aromatic dicarboxylic acid dihalides, preferably benzenedicarboxylic acid dihalides, by the phase interface process, optionally using chain terminators, for example monophenols, and optionally using branching agents which are trifunctional or more than trifunctional, for example triphenols or tetraphenols. A preparation via a melt polymerization process by reaction of diphenols with, for example, diphenyl carbonate is also possible.

Preferred diphenols for the preparation of the aromatic polycarbonates and/or aromatic polyester carbonates are hydroquinone, resorcinol, dihydroxydiphenols, bis-(hydroxyphenyl)-C1-C5-alkanes, bis-(hydroxyphenyl)-C5-C6-cycloalkanes, bis-(hydroxyphenyl)ethers, bis-(hydroxyphenyl)sulfoxides, bis-(hydroxyphenyl)ketones, bis-(hydroxyphenyl)sulfones and α, a-bis-(hydroxyphenyl)-diisopropyl-benzenes and nucleus-brominated and/or nucleus-chlorinated derivatives thereof. Particularly preferred diphenols are 4,4'-dihydroxydiphenyl, bisphenol A, 2,4-bis-(4-hydroxyphenyl)-2-methylbutane, 1,1-bis-(4-hydroxyphenyl)-cyclohexane, 1,1-bis-(4-hydroxyphenyl)-3,3,5-trimethylcyclohexane, 4,4'-dihydroxydiphenyl sulfide, 4,4'-dihydroxydiphenyl sulfone and di- and tetrabrominated or chlorinated derivatives thereof, such as, for example, 2,2-bis-(3-chloro-4-hydroxyphenyl)-propane, 2,2-bis-(3,5-dichloro-4-hydroxyphenyl)-propane or 2,2-bis-(3,5-dibromo-4-hydroxyphenyl)-propane. 2,2-bis-(4-hydroxyphenyl)-propane (bisphenol A) is particularly preferred. The diphenols may be employed individually or as any desired mixtures. The diphenols are known from the literature or obtainable by processes known from the literature.

The thermoplastic, aromatic polycarbonates have average weight-average molecular weights (MW, measured e.g. by ultracentrifuge or scattered light measurement) of from 10,000 to 200,000 g/mol, preferably 15,000 to 80,000 g/mol, particularly preferably 24,000 to 32,000 g/mol. The thermoplastic, aromatic polycarbonates may be branched in a known manner, and in particular preferably by incorporation of from 0.05 to 2.0 mol %, based on the sum of the diphenols employed, of compounds which are trifunctional or more than trifunctional, for example those having three and more phenolic groups. Both homopolycarbonates and copolycarbonates are suitable.

Preferred polycarbonates are, in addition to the bisphenol A homopolycarbonates, the copolycarbonates of bisphenol A with up to 15 mol %, based on the sum of the moles of diphenols, of other diphenols mentioned as preferred or particularly preferred, in particular 2,2-bis-(3,5-dibromo-4-hydroxyphenyl)-propane.

Aromatic dicarboxylic acid dihalides for the preparation of aromatic polyester carbonates are preferably the diacid dichlorides of isophthalic acid, terephthalic acid, diphenyl ether-4,4'-dicarboxylic acid and of naphthalene-2,6-dicarboxylic acid. Mixtures of the diacid dichlorides of isophthalic acid and of terephthalic acid in a ratio of between 1:20 and 20:1 are particularly preferred. A carbonic acid halide, preferably phosgene, is additionally co-used as a bifunctional acid derivative in the preparation of polyester carbonates. The aromatic polyester carbonates may also contain incorporated aromatic hydroxycarboxylic acids.

The aromatic polyester carbonates may be either linear or branched in a known manner (in this context see DE-A 2 940 024 and DE-A 3 007 934).

The relative solution viscosity (ηrel) of the aromatic polycarbonates and polyester carbonates is in the range of 1.18 to 1.4, preferably 1.20 to 1.32 (measured on solutions of 0.5 g polycarbonate or polyester carbonate in 100 ml methylene chloride solution at 25° C.). The thermoplastic, aromatic polycarbonates and polyester carbonates may be employed by themselves or in any desired mixture of one or more, preferably one to three or one or two thereof. Most preferably only one type of polycarbonate is used.

Most preferably the aromatic polycarbonate is a polycarbonate based on bisphenol A and phosgene, which includes polycarbonates that have been prepared from corresponding precursors or synthetic building blocks of bisphenol A and phosgene. These preferred aromatic polycarbonates may be linear or branched due to the presence of branching sites.

Polyamides which are suitable for the afore-mentioned blends of ABS- or ASA-resins are described in EP-A 2537895 in paragraphs 39 to 40 to which is in particular referred.

Suitable polyamides are known homopolyamides, copolyamides and mixtures of such polyamides. They may be semi-crystalline and/or amorphous polyamides.

Suitable semi-crystalline polyamides are polyamide-6, polyamide-6,6, mixtures and corresponding copolymers of those components. Also included are semi-crystalline polyamides the acid component of which consists wholly or partially of terephthalic acid and/or isophthalic acid and/or suberic acid and/or sebacic acid and/or azelaic acid and/or adipic acid and/or cyclohexanedicarboxylic acid, the diamine component of which consists wholly or partially of m- and/or p-xylylene-diamine and/or hexamethylenediamine and/or 2,2,4-trimethylhexamethylenediamine and/or 2,2,4-trimethylhexamethylenediamine and/or isophoronediamine, and the composition of which is in principle known. Mention may also be made of polyamides that are prepared wholly or partially from lactams having from 7 to 12 carbon atoms in the ring, optionally with the concomitant use of one or more of the above-mentioned starting components.

Particularly preferred semi-crystalline polyamides are polyamide-6 and polyamide-6,6 and mixtures thereof.

Known products may be used as amorphous polyamides. They are obtained by polycondensation of diamines, such as ethylenediamine, hexamethylenediamine, decamethylenediamine, 2,2,4- and/or 2,4,4-trimethylhexamethylenediamine, m- and/or p-xylylene-diamine, bis-(4-aminocyclohexyl)-methane, bis-(4-aminocyclohexyl)-propane, 3,3'-dimethyl-4,4'-diamino-dicyclohexylmethane, 3-aminomethyl-3,5,5-trimethylcyclohexylamine, 2,5- and/or 2,6-bis-(aminomethyl)-norbornane and/or 1,4-diaminomethylcyclohexane, with dicarboxylic acids such as oxalic acid, adipic acid, azelaic acid, azelaic acid, decanedicarboxylic acid, heptadecanedicarboxylic acid, 2,2,4- and/or 2,4,4-trimethyladipic acid, isophthalic acid and terephthalic acid.

Also suitable are copolymers obtained by polycondensation of a plurality of monomers, as well as copolymers prepared with the addition of aminocarboxylic acids such as ε-aminocaproic acid, ω-aminoundecanoic acid or ω-aminolauric acid or their lactams.

Particularly suitable amorphous polyamides are the polyamides prepared from isophthalic acid, hexamethylenediamine and further diamines such as 4,4'-diaminodicyclohexylmethane, isophoronediamine, 2,2,4- and/or 2,4,4-trimethylhexamethylenediamine, 2,5- and/or 2,6-bis-(aminomethyl)-norbornene; or from isophthalic acid, 4,4'-diaminodicyclohexylmethane and ε-caprolactam; or from isophthalic acid, 3,3'-dimethyl-4,4'-diaminodicyclohexylmethane and laurinlactam; or from terephthalic acid and the isomeric mixture of 2,2,4- and/or 2,4,4-trimethylhexamethylenediamine.

The polyamides preferably have a relative viscosity (measured on a 1 wt. % solution in m-cresol or 1% (weight/volume) solution in 96 wt. % sulfuric acid at 25° C.) of from 2.0 to 5.0, particularly preferably from 2.5 to 4.0.

In particular preferred polyamides are e.g. Ultramid® grades such as Ultramid B24N 03 or Ultramid B27E commercially available from BASF SE, Germany.

The matrix polymer (I) of the afore-mentioned preferably comprises or consists of:
28 to 52 wt.-%, more preferred 35 to 45 wt.-%, most preferred 36 to 41 wt.-% polyamide (component I"), and
48 to 72 wt.-%, more preferred 55 to 65 wt.-%, most preferred 59 to 64 wt.-% ABS resin (component I'),
wherein the sum of components (I') and (I") totals 100% by weight.

Such ABS resins with polyamide are commercially available as Terblend® N grades from Styrolution company (Frankfurt, Germany).

The matrix polymer (I) of the afore-mentioned blends of ABS resins with polyamide preferably comprises or consists of:
34 to 74 wt.-%, more preferred 55 to 72 wt.-%, most preferred 58 to 70 wt.-% polyamide (component I"), and
26 to 66 wt.-%, more preferred 28 to 45 wt.-%, most preferred 30 to 42 wt.-% ABS resin (component I'),
wherein the sum of components (I') and (I") totals 100% by weight.

ABS resins with polycarbonate are commercially available as Novodur® Ultra grades from Styrolution company (Frankfurt, Germany).

The matrix polymer (I) of the afore-mentioned blends of ASA resins with polyamide preferably comprises or consists of:
28 to 52 wt.-%, more preferred 35 to 45 wt.-%, most preferred 36 to 41 wt.-% polyamide (component I"), and
48 to 72 wt.-%, more preferred 55 to 65 wt.-%, most preferred 59 to 64 wt.-% ASA resin (component I'),
wherein the sum of components (I') and (I") totals 100% by weight.

Such ASA resins with polyamide are commercially available as Terblend S grades, e.g. Terblend S NM-31 from Styrolution company (Frankfurt, Germany).

The matrix polymer (I) of the afore-mentioned blends of ASA resins with polyamide preferably comprises or consists of:
34 to 74 wt.-%, more preferred 55 to 72 wt.-%, most preferred 58 to 70 wt.-% polyamide (component I"), and
26 to 66 wt.-%, more preferred 28 to 45 wt.-%, most preferred 30 to 42 wt.-% ASA resin (component I'),
wherein the sum of components (I') and (I") totals 100% by weight.

ASA resins with polycarbonate are commercially available as Luran SC grades e. g. Luran S KR2864C from Styrolution company (Frankfurt, Germany).

Suitable elastomeric block copolymers used as styrenic polymer (I') for the inventive TCP resin composition are:
block copolymers of the structure $(S—(B/S))_n$—S, where S is a vinylaromatic—in particular styrene—block forming a hard phase, (B/S) is a random copolymer block of vinylaromatic monomer—in particular styrene—and of 1,3-diene—in particular 1,3-butadiene—forming a soft phase, and n are natural numbers from 1 to 10, preferably 1 to 4,
wherein the elastomeric block copolymer has a monomer composition comprising 25 to 60% by weight of diene, in particular 1,3-butadiene, and 75 to 40% by weight of vinylaromatic compound, in particular styrene,
the glass transition temperature Tg of block S is above 25° C. and that of block (B/S) is below 25° C., and the proportion of the hard phase in the elastomeric block copolymer is from 5 to 40% by weight and the relative amount of 1,2 linkages of the polydiene, based on the sum of 1,2- and 1,4-cis/trans-linkages, is less than 15%, preferably less than 12%.

Said block copolymers (I') are prepared by anionic polymerization in a nonpolar solvent, initiation being effected by means of organometallic compounds. Compounds of the alkali metals, in particular of lithium, are preferred.

Examples of initiators are methyl-lithium, ethyllithium, propyllithium, n-butyllithium, sec-butyllithium and tert-butyllithium. The organometallic compound is added as a solution in a chemically inert hydrocarbon. The dose depends on the intended molecular weight of the polymer but is, as a rule, from 0.002 to 5 mol %, based on the monomers. Preferably used solvents are aliphatic hydrocarbons, such as cyclohexane and methylcyclohexane.

The random blocks of the block copolymers (I'), which blocks simultaneously contain vinylaromatic and diene, are prepared with the addition of a soluble potassium salt, in particular of a potassium alcoholate. Preferred potassium alcoholates are tertiary alcoholates of at least 7 carbon atoms and typical corresponding alcohols are, for example, 3-ethyl-3-pentanol and 2,3-dimethyl-3-pentanol in particular Tetrahydrolinalool (3,7-dimethyl-3-octanol). In the case of alkyllithium-initiated polymerization in a nonpolar solvent such as cyclohexane, the molar ratio of lithium to potassium is from about 10:1 to 40:1.

The preparation of elastomeric block copolymers (I') is described in detail in U.S. Pat. No. 6,197,889.

A preferred block copolymer (I') is one of the general formulae S—(B/S)—S, and a particularly preferred block copolymer is one whose soft phase is divided into blocks $(B/S)_1$-$(B/S)_2$; $(B/S)_1$-$(B/S)_2$-$(B/S)_1$; $(B/S)_1$-$(B/S)_2$-$(B/S)_3$; where the blocks have different compositions or their vinylaromatic/diene ratio in the individual blocks (B/S) changes in such a way that a composition gradient $(B/S)_{p1} \ll (B/S)_{p2} \ll (B/S)_{p3}$ . . . occurs in each segment (part-block), the glass transition temperature Tg of each part-block being less than 25° C. Such block copolymers which have within a block (B/S), for example, p repeating segments (part-blocks) with changing monomer composition can be formed by addition of p portions of the monomers, where p is an integer from 2 to 10.

A block copolymer which has a plurality of blocks (B/S) and/or S, each having a different molecular weight per molecule, is likewise preferred.

Preferred vinylaromatic compounds are styrene and furthermore alpha-methylstyrene and vinyltoluene and mixtures of these compounds. Suitable dienes are conjugated dienes preferably 1,3-butadiene and isoprene, and furthermore piperylene, 1-phenylbutadiene and mixtures of these compounds. A particularly preferred monomer combination comprises 1,3-butadiene (=butadiene) and styrene.

The (B/S) block is composed of, for example, 75 to 40% by weight of styrene and 25 to 60% by weight of butadiene. Particularly preferably, the (B/S) block has a butadiene content of from 35 to 70% and a styrene content of from 65 to 30%.

In the case of the monomer combination styrene/butadiene, the amount by weight of the diene in the total block copolymer is 15 to 65% by weight and that of the vinylaromatic component is accordingly 85 to 35% by weight. Butadiene/styrene block copolymers having a monomer composition comprising 25 to 60% by weight of diene and 75 to 40% by weight of vinylaromatic compound are particularly preferred.

The amount by weight of the soft phase composed of diene and vinylaromatic sequences—preferably 1,3-butadiene and styrene sequences—in the solid is 60 to 95%, preferably 70 to 90%, particularly preferably 80 to 90% by weight. The blocks S formed from the vinylaromatic monomers—in particular styrene—form the hard phase, the amount by weight accordingly accounts for 5 to 40, preferably 10 to 30, particularly preferably 10 to 20% by weight.

The amount by weight of the two phases can be measured by quantitative DSC (cyclic method yielding a stable, flat baseline) and solid state proton NMR relaxation (quantitative method to determine the different phases according to their softening temperature). the future phase ratio of a polymer can also be calculated from the amounts of monomers used if complete polymerization is permitted in each case and the different blocks can be assigned to phases.

The molecular weight of block S is in general from 1000 to 200,000, preferably from 3000 to 80,000, g/mol. Within a molecule, blocks S may have different molecular weights.

The molecular weight of the block (B/S) is usually from 2000 to 250,000, preferably from 5000 to 150,000, g/mol.

As in the case of a block S, a block (B/S), too, may have different molecular weights within a molecule.

Very particular preferred block copolymers (I') according to the present invention are linear styrene-butadiene block copolymers of the general structure S—(B/S)—S having, situated between the two styrene S blocks, one or more, preferably 1, 2 or 3, more preferably one (B/S)-random blocks having random styrene/butadiene distribution. The afore-mentioned linear styrene-butadiene block copolymers are commercially available as Styroflex® 2G 66 from Styrolution, Germany.

Component (II)

Component (II) according to the invention is at least one thermally conductive filler material (II) consisting of at least one—preferably one—ceramic material and/or graphite.

Only one of said thermally conductive filler materials (II), or a mixture of two or more of them (referred to as filler materials (II-1), (II-2), etc.) may be used.

If two or more of said thermally conductive filler materials (II) are present, the volume ratio between the filler materials (II-1), (II-2) etc. can be selected in broad ranges.

Preferably only one filler material (II) is used.

According to the present invention the ceramic material is a thermally conductive material which is preferably selected from the group consisting of: boron nitride, aluminosilicate and silicon carbide.

The thermally conductive filler material (II) is preferably selected from the group consisting of: boron nitride, aluminosilicate and graphite.

The filler material (II) can comprise differently shaped particles such as spheres, flakes, rods etc.

According to one embodiment a combination of spherical particles with flakes and/or rod like structures is used as filler material (II).

Usually by increasing the filler content it is possible to lift up the thermal conductivity, often at expense of mechanical properties and surface quality. A large fraction of small particles of the filler material (II) can increase the viscosity of the TCP resin during processing. Very large particles can result in problems during injection molding.

It was surprisingly found, that the special mixing ratios of the filler materials (II-1) and (II-2), specific concentrations of filler materials (II) in the TCP resin and the specific particle size of the filler material (II) lead to an optimum for thermal conductivity, mechanical properties and surface quality. Further it was surprisingly found, that by chemical foaming of the resin composition (X) using a chemical foaming agent (Y) the thermal conductivity can be significantly increased compared to the non-foamed resin composition.

Preferably, the average particle size (weight median diameter $D_{50}$) of the filler material (II) is less than 200 microns, and more preferably, less than 100 microns; as measured using mesh analysis (e.g. Retsch AS 200 jet), Transmission Electron Microscopy (TEM), dynamic image analysis (e.g. Retsch Camsizer XT) or laser light scattering (e.g. Horiba LA-300).

Preferably, the average particle size ($D_{50}$) of the filler material (II) is from 1 to 100 µm, more preferably from 1 to 80 µm, most preferably from 3 to 50 µm.

Particles or granules which have multi-modal size distribution in their particle size can also be used.

Suitable boron nitrides (BN) used as filler material (II) according to the invention include cubic boron nitride, hexagonal boron nitride, amorphous boron nitride, rhombohedral boron nitride, or another allotrope, as well as combinations comprising at least one of the foregoing. It may be used as powder, agglomerates, fibers, or the like, or a combination comprising at least one of the foregoing. Hexagonal boron nitride, in particular in form of platelets, is preferred.

Boron nitride has preferably an average particle size of 1 to 200 micrometers. Within this range boron nitride particles having sizes of greater than or equal to 3, specifically greater than or equal to 5 micrometers may be advantageously used. Also desirable are boron nitride particles having sizes of less than 200 micrometers. The average particle size ($D_{50}$) of the BN particle is more preferably in the range of from 3 to 200 micrometers, most preferably in the range of from 5 to 50 micrometers. The particle size indicated here means the single BN particle or its agglomerate at any of their dimensions. The boron nitride particles can exist in the form of agglomerates or as individual particles or as combinations of individual particles and agglomerates. Preferably the BN has a BN purity of greater than or equal to 95 wt %, specifically, greater than or equal to 99.8 wt %.

Aluminosilicates suitable as ceramic filler material (II) for the present invention are based on natural occurring aluminosilicates having preferably an average particle size from 3 to 100 µm, in particular 2 to 25 µm ($D_{50}$: Mass-median-diameter (MMD), average particle diameter by mass determined by a Cilas laser granulometer.

Said aluminosilicates can be used without further treatment or the surface can be treated with a coupling agent, for the purpose of improving the interfacial bonding between the aluminosilicate surface and the matrix polymer (I). Examples of the coupling agent include such of the silane series, titanate series and zirconate series, preferably of the silane series, in particular preferred is methacrylsilane.

The coupling agent is preferably added to the aluminosilicate before mixing the filler material (II) with the matrix polymer (I). Aluminosilicates suitable as ceramic filler material (II) for the present invention are commercially available as Silatherm®, in particular Silatherm 1360-010, Silatherm 1360-400 and Silatherm 1360-400MST, from Quarzwerke Frechen.

The density of the afore-mentioned aluminosilicates is usually about 3 to 4 g/cm³.

When graphite is used as filler material (II), the graphite may be synthetically produced or naturally produced as far as it has flake shape. Naturally produced graphite is preferred.

There are three types of naturally produced graphite that are commercially available. They are flake graphite, amorphous graphite and crystal vein graphite as naturally produced graphite.

Flake graphite, as indicated by the name, has a flaky morphology. Amorphous graphite is not truly amorphous as its name suggests but is actually crystalline. Crystal vein graphite generally has a vein like appearance on its outer surface from which it derives its name.

Synthetic graphite can be produced from coke and/or pitch that are derived from petroleum or coal. Synthetic graphite is of higher purity than natural graphite, but not as crystalline.

Flake graphite and crystal vein graphite that are naturally produced are preferred in terms of thermal conductivity and dimension stability, and flake graphite is more preferred.

Especially preferred graphite filler materials (II) are graphite flakes, in particular naturally produced graphite flakes, having a particle size of from about 5 to about 100 µm and preferably about 20 to about 80 µm.

The purity of the graphite ranges from 80 to 99.9% carbon; high purities of more than 99.5% carbon are preferred.

Among the afore-mentioned filler materials (II) boron nitride is most preferred.

Furthermore preferred is a mixture of boron nitride (II-1) and aluminosilicate (II-2). Preferably in said mixture boron nitride (II-1) is the main component.

According to one preferred embodiment the volume ratio of boron nitride (II-1) and aluminosilicate (II-2) is 15:1 to 5:1, more preferably 12:1 to 8:1.

Component (Y)

Chemical foaming agents (CFAs)—component (Y)—are known and are used on a wide scale. Such agents can be organic or inorganic compounds and can be categorized as either endothermic or exothermic. All types CFA release gases such (mainly carbon dioxide or nitrogen) upon thermal decomposition. The decomposition temperature depends on the type and the chemical nature of the CFA and is generally in range of from 110 to 340° C. Endothermic chemical foaming agents are characterized by the consumption of thermal energy during decomposition, accompanied by elimination of at least one gaseous reaction product like carbon dioxide. An exothermic chemical foaming agents releases thermal energy during decomposition, also accompanied by release of at least one gaseous reaction product.

Suitable and preferred chemical foaming agents for the present invention are at least one compound selected from the group consisting of: Sodium carbonate, Sodium hydrogen carbonate, Magnesium carbonate, Stearic acid, Sodium stearate, Potassium stearate, Magnesium stearate, Zinc carbonate and Citric acid derivatives. Other organis acids and salts of organic acids (e.g. rosin soap and derivatives) can also be used.

Also mixtures of the afore-mentioned products are allowed. In that case, mixtures of citric acid with carbonates (sodium carbonate, sodium hydrogen carbonate, magnesiumcarbonate) are in particular preferred.

Furthermore suitable CFAs for the present invention are one or more of the compounds selected from the group consisting of: Azodicarbonamide (ADC), 4,4-Oxybis(benzenesulfonyl-hydrazide) (OBSH), P-Toluenesulfonylhydrazide (TSH), P-toluenesulfonylsemi-carbazide (TSS), Dinitrosopentamethlenetetramine, Polyphenyl sulfoxide (PPSO) and 5-phenyltetrazole.

Among said chemical foaming agents ADC, OBSH, TSH, TSS and Dinitrosopentamethlenetetramine are examples for the exothermic type and Sodium hydrogen carbonate, Zinc carbonate, Citric acid derivatives and 5-phenyltetrazole are examples for the endothermic type.

In particular preferred are CFAs based on hydrogen carbonate and citric acid, most preferably citric acid derivatives, which are commercially available as Hydrocerol® from Clariant Masterbatches (Deutschland) GmbH.

Component (Y) is used in amounts of from preferably 0.5 to 5%, more preferably 1 to 3%, most preferably 1.5 to 2.5% by weight, based on components (X) and (Y).

Component (Z)

Preferably, component (Z) has either a wax/talcum-like appearance at normal conditions (20° C., 1013 mbar, no addition of solvents) and/or a molecular weight of not more than 5 kDa, in particular not more than 1 KDa. The component (Z) may be any additive known for plastics in the art. These are exemplarily processing aids (e.g. emulsifiers, polymerization initiators, buffer substances, conventional dispersing agents, such as low-molecular-weight waxes, e.g. polyethylene waxes, or stearates, such as magnesium stearate or calcium stearate), a plasticizer, a glossing agent, an antioxidant, a metal deactivator, an antistatic agent, a flow agent, an anti-sticking agent, metal ions, fatty acids, pigments, dyes, flame retardant additives, and stabilizers, such as light stabilizer (e.g., an UV-absorber), a process stabilizer, or a radical scavenger, and a phenolic primary stabilizer.

Suitable antioxidants are sterically hindered mono- or polynuclear phenolic antioxidants, which may be substituted in various ways and also bridged via substituents. These include not only monomeric but also oligomeric compounds, which may be built up from more than one fundamental phenol unit. Hydroquinones and substituted compounds which are hydroquinone analogs are also suitable, as are antioxidants based on tocopherols and their derivatives. Mixtures of different antioxidants may also be used. In principle, it is possible to use any compound which is commercially available or suitable for styrene copolymers, such as Topanol® or Irganox®.

Alongside the phenolic antioxidants mentioned as examples above, it is possible to use costabilizers, in particular phosphorus- or sulfur-containing costabilizers. Such phosphorus- or sulfur containing costablizers are known to the person skilled in the art and are commercially available.

Examples of suitable antistats are amine derivatives, such as N,N-bis(hydroxyalkyl)-alkylamines or -alkyleneamines, polyethylene glycol esters, copolymers of ethylene glycol and propylene glycol, and glycerol mono- and distearates, and mixtures of these.

Pigments are composed of solid particles less than 100 µm, preferably less than 50 µm, more preferably less than 1 µm in diameter. Examples of pigments are titanium dioxide, zinc chromate, phthalocyanines, lithopone, ultramarine blue, iron oxides and carbon black, and the entire class of organic pigments.

Examples of flame retardants are the halogen-, sulfur or phosphorus-containing compounds and/or mixtures thereof known to the person skilled in the art, magnesium hydroxide and other customary compounds or mixtures of these. Red phosphorus is also suitable.

Dyes are all dyes which can be used for the transparent, semitransparent or nontransparent coloration of polymers, in particular those which are suitable for coloration of styrene based copolymers. Dyes of this type are known to the person skilled in the art.

Examples of suitable stabilizers to counter the action of light (UV-stabilizer) are various substituted resorcinols, salicylates, benzotriazoles, benzophenones and HALS (hindered amine light stabilizers), commercially available, for example, as Tinuvin®.

A component (Z) as used herein may be added to the styrene copolymer composition on purpose or may result from the production process of either the polymer raw components and/or the blending process (e.g., as residual(s) from solvent(s), monomer(s), activator(s), precipitation and/or purification step(s), degradation products from monomer(s), activator(s) and/or other pyrolytic product(s)).

The additive may be added upon blending the polymer raw components and/or may be comprised in one or more of the polymer raw component(s).

According to one preferred embodiment the inventive TCP resin composition comprises (or consists of) components (X) and (Y) in the following amounts:

95 to 99.5%, preferably 97 to 99% by weight of component (X) comprising (or consisting of):
- 60 to 85%, preferably 65 to 80% by volume of an ABS (acrylonitrile-butadiene-styrene) resin (I') as matrix polymer (I),
- 15 to 40%, preferably 20 to 35% by volume of aluminosilicate, boron nitride and/or graphite, preferably boron nitride, as filler material (II), having an average particle size ($D_{50}$) from 1 to 200, preferably 1 to 100 µm,
- wherein the sum of components (I) and (II) totals 100% by volume; and 0.5 to 5% by weight of at least one chemical foaming agent as component (Y) selected from the group consisting of: Sodium carbonate, Sodium hydrogen carbonate, Magnesium carbonate, Stearic acid, Sodium stearate, Potassium stearate, Magnesium stearate, Zinc carbonate and Citric acid derivatives;

wherein the sum of components (X) and (Y) totals 100% by weight.

Preparation of TCP Resin Composition

Further subject of the invention is a process for the preparation of the inventive TCP resin composition by (i) melt-mixing of the matrix polymer (I); (ii) addition and homogeneous dispersion of the filler material (II) and, if present, optional components (Z); and (iii) mixing and injection-molding of the obtained homogeneous resin composition with a chemical foaming agent (Y).

The preparation of the inventive TCP resin composition follows conventional procedure steps which are well known in the art.

The TCP resin compositions are in the form of a melt-mixed blend, wherein all of the polymeric components are well-dispersed within each other and all of the non-polymeric ingredients are homogeneously dispersed in and bound by the polymer matrix, such that the blend forms a unified whole. The blend may be obtained by combining the component materials using any melt-mixing method. The component materials may be mixed to homogeneity using a melt-mixer such as a single or twin-screw extruder, blender, kneader, Banbury mixer, etc. to give a resin composition.

Part of the materials may be mixed in a melt-mixer, and the rest of the materials may then be added and further melt-mixed until homogeneous. The sequence of mixing in the manufacture of the TCP resin composition of this invention may be such that the matrix polymer (I) may be melted in one shot and the filler material (II) and optional components (Z) may be fed from a side feeder, and the like, as will be understood by those skilled in the art.

Preferably, the components (I), (II) and, if present, optional components (Z) are extrusion blended or compounded in a high intensity blender such as a twin-screw extruder. The obtained resin composition can be extruded via a die plate and then the chilled polymer strands are preferably granulated.

Preferably, the preferably granulated polymer is (pre-)mixed with a chemical foaming agent in the afore-mentioned amounts. Pre-foaming of the CFA prior to filling the mold has to be avoided. Then the (pre-)mixed composition according to the invention can be injection molded with a common injection molding machine.

The thermoplastic molding composition can be formed into shaped articles by a variety of means such as injection molding, extrusion, compression forming, vacuum forming, blow molding etc. well established in the art.

A further subject of the invention is a shaped article made from the inventive TCP resin composition.

Shaped articles comprising (or consisting of) the inventive TCP resin composition can be used for automotive applications or as a heat sink for high performance electronics or for LED sockets or electrical and electronic housings.

A further subject of the invention is the use of said shaped articles for the afore-mentioned applications.

Compared to material according to the prior art the inventive TCP resin composition shows a light weight and a high gloss surface. Furthermore the inventive TCP resin composition shows significant improvements in terms of processability and a high degree for shaping.

The present invention is further described by the following examples and claims.

EXAMPLES

Materials:
Component I:
ABS: Terluran® HI-10 (high impact, medium flow, injection molding and extrusion grade ABS of Styrolution, Frankfurt).

Elastomeric block copolymer: Styroflex® 2G 66 from Styrolution, Frankfurt.

Component II:
Boron nitride (BN-1): hexagonal crystal structure, plates, $D_{50}=7$ μm, $D_{100}=30$ μm, density: 2.2 g/cm³ (Boron nitride PCTFS from Saint Gobain, Germany).

Boron nitride (BN-2): Mixed platelets, agglomerates, $D_{50}=16$ μm, density: 2.2 g/cm³ (Boron nitride BN CFX1022 from Momentive Performance Materials Inc., USA).

Aluminosilicate: Silatherm® Grade: 1360-400 MST (source: Quarzwerke Frechen), a natural occuring aluminosilicate treated with methacrylsilane, $D_{50}=5$ μm ($D_{10}=1$ μm, $D_{90}=16$ μm), density: 3.65 g/cm³.

Component Y:
CFA: Hydrocerol® 473 from Clariant Masterbatches (Deutschland) GmbH.

Matrix polymer (I) and filler material (II) were mixed and compounded with a twin screw extruder ZSK 26 from Coperion GmbH (length/diameter (L/D)-ratio: 40). The obtained homogeneous polymer composition was then formed into granulate.

Then the foaming agent (Y) (2 wt.-%, based on the entire composition consisting of components (I), (II) and (Y)) was pre-mixed to said granulate and processed by injection molding (machine: Arburg 320 S500-150):

Examples 1 and 2, Comparative Examples 1 and 2

Sample plates: 80 mm*80 mm*2 mm (one side polished)
processing conditions: T(cylinder)=260° C., T(mold)=70° C., injection speed 170 cm³/s, max. injection pressure 1000 bar, packing pressure 0 bar
Measurement Methods:
Thermal conductivity $\kappa = \alpha \cdot c_p \cdot \rho$:
thermal diffusivity α: determined by Laser flash analysis (XFA 500 XenonFlash apparatus (Linseis) with an InSb infrared detector) through-plane measurement, Temp. 25° C. under air
specific heat $c_p$ was determined by DSC (TA Instruments Q1000 DSC), 20 K/min, 50 ml/min N2, 10 to 30 mg sample, ASTM E1269
temperature program:
1. slope set to 200 to 215° C.
2. isotherm for 10 minutes
3. slope set to minus 40° C.
4. isotherm for 10 minutes
5. slope set to 200 to 215° C.

density ρ is determined by Buoyancy Balance (Mettler Toledo AG245)
Mechanical Characterization
Injection molding of Charpy samples (80 mm*10 mm*3 mm) with Engel e-mac 50 (Table 3)
un-notched Charpy impact strength was measured according to ISO 179/1eU Table 1 shows the results of the inventive foamed TCP ABS resin compositions (Exp. 1 and 2) comprising boron nitride (BN-1) and a CFA in comparison to a compact TCP ABS resin composition (cp. Exp. 1 and 2) prepared without CFA. The amount of the filler material in % by weight is based on the total of components (I) and (II).

TABLE 1

| Sample No. | wt.-% BN (II) | Vol.-% BN (II) | | Thermal diffusivity [cm²/s] | Thermal conductivity [W/m · K] |
|---|---|---|---|---|---|
| cp. Exp. 1 | 40 | 23.3 | Compact | 0.002455 | 0.352 |
| Exp. 1 | | | Foamed | 0.00277 | 0.432 |
| cp. Exp. 2 | 50 | 31.3 | Compact | 0.00412 | 0.635 |
| Exp. 2 | | | Foamed | 0.005495 | 0.901 |

Table 1 shows that the thermal diffusivity is significantly increased by chemical foaming depending on the filler level (40 wt-%: 11%, 50 wt-%: 42%). A significant increase of the thermal conductivity can be also established. Compared at the same filler content by volume, the foamed resin composition has a significantly higher thermal conductivity than the not foamed resin composition.

Example 3

TABLE 2

| TCP resin composition | | | |
|---|---|---|---|
| Component (I) | Component (II-1) | Component (II-2) | Additive (Z) |
| 60 vol. % Styroflex 2G66 | 36.4 vol.-% BN-2 (64.7 wt.-%) | 3.6 vol.-% aluminosilicate, (6.0 wt.-%) | 2 wt.-% TiO₂ (based on entire resin composition) |

As described for examples 1 and 2 above a granulate was obtained from the composition as shown in Table 2 above. The foaming agent (Y) (2 wt.-%, based on the entire composition consisting of components (I), (II), (Z) and (Y)) was pre-mixed to said granulate and processed by injection molding (machine: Engel e-mac 50, screw diameter 30 mm, plates: 70 mm*70 mm*4 mm) under the following conditions:

T(cylinder) 220° C., T(mold) 50° C., injection speed 75 cm³/s, melt pressure 100 bar, packing pressure 100 bar/0.1 s, weight reduction 5.10%, cooling time 25 s
Said sample plates (70 mm*70 mm*4 mm) were used to determine the thermal conductivity.

For the measurement of the un-notched Charpy impact strength un-notched Charpy impact strength was determined according to ISO 179/1 eU foamed universal test specimens (plates: 80 mm*10 mm*3 mm) have been prepared under the injection molding conditions as hereinbefore mentioned, but the cooling time is 20 s.

Compact universal test specimens (comparative examples, without foaming agent) for comparative measurements have been prepared under the same conditions as hereinbefore mentioned.

The results of the measurements of example 3 (foamed) and comparative example 3 (compact) are shown in Tables 3 and 4.

TABLE 3

| | Thermal conductivity | | | | | | |
|---|---|---|---|---|---|---|---|
| | Kappa [W/m*K] | | Increase in thermal | Thermal diffusivity [cm²/s] | | Heat capacity [J/g*K] | |
| | Compact | Foamed* | conductivity | Compact | Foamed* | Compact | Foamed |
| 3 | 0.991 | 1.133 | 14.33% | 0.00486 | 0.00579 | 0.936 | 0.936 |

(*measured at end of flow path)

TABLE 4

| | Mechanical properties: | | |
|---|---|---|---|
| | Un-notched Charpy impact strength [kJ/m²] | | Weight reduction |
| | Compact | foamed | [%] |
| 3 | 46.46 | 56.48 | 5.1 |

The obtained data show a strong increase in the thermal conductivity and a weight reduction of 5.1% is observed. The un-notched Charpy impact strength is not deteriorated by foaming.

The invention claimed is:

1. A thermally conductive polymer (TCP) resin composition comprising components (X) and (Y):
90 to 99.9% by weight of component (X) which is a composition comprising components (I) and (II):
60 to 85% by volume of at least one matrix polymer (I) as component (I) comprising styrenic polymers (I') selected from the group consisting of: ABS (acrylonitrile-butadiene-styrene) resins, ASA (acrylonitrile-styrene-acrylate) resins, and elastomeric block copolymers; wherein the elastomeric block copolymers have a structure (S—(B/S))$_n$—S, where S is a vinylaromatic block forming a hard phase, (B/S) is a random copolymer block of vinylaromatic monomer and of a conjugated diene forming a soft phase, and n are natural numbers from 1 to 10, wherein the elastomeric block copolymer has a monomer composition comprising from 25 to 60% by weight (based on the elastomeric block copolymer) of diene and from 75 to 40% by weight (based on the elastomeric block copolymer) of vinylaromatic compound, the glass transition temperature Tg of block S is above 25° C. and that of block (B/S) is below 25° C., wherein the proportions of the soft phase and the hard phase total 100% by weight and the proportion of the hard phase in the elastomeric block copolymers is from 5 to 40% by weight and the relative amount of 1,2 linkages of the diene, based on the sum of 1,2- and 1,4-cis/trans-linkages, is less than 15%;
15 to 40% by volume of at least one thermally conductive filler material (II) as component (II) having a weight median particle diameter ($D_{50}$) of from 1 to 200 μm,
which consists of at least one ceramic material and/or graphite;
wherein components (I) and (II) total 100% by volume;
0.1 to 10% by weight of at least one chemical foaming agent as component (Y);
wherein components (X) and (Y) total 100% by weight; and
the thermal conductivity K is more than 0.4 W/m·K.

2. The thermally conductive polymer (TCP) resin composition according to claim 1, wherein the matrix polymer (I) comprises at least one further thermoplastic polymer (I″) selected from the group consisting of: polycarbonates and polyamides.

3. The TCP resin composition according to claim 1, wherein the matrix polymer (I) is selected from the group consisting of: ABS resins, ASA resins, elastomeric block copolymers of the structure (A-(B/A))$_n$-A, blend of ABS resins with polycarbonate, blend of ABS resins with polyamide, blend of ASA resins with polycarbonate, and blend of ASA resins with polyamide.

4. The TCP resin composition according to claim 1, wherein component (X) comprises 65 to 80% by volume of component (I) and 20 to 35% by volume of component (II).

5. The TCP resin composition according to claim 1, comprising 95 to 99.5% by weight of component (X) and 0.5 to 5% of component (Y).

6. The TCP resin composition according to claim 1, wherein the thermally conductive filler material (II) consists of boron nitride, aluminosilicate, and/or graphite.

7. The TCP resin composition according to claim 1, wherein the chemical foaming agent is at least one compound selected from the group consisting of: Sodium carbonate, Sodium hydrogen carbonate, Magnesium carbonate, Stearic acid, Sodium stearate, Potassium stearate, Magnesium stearate, Zinc carbonate, and Citric acid derivatives.

8. The TCP resin composition according to claim 1, wherein the thermally conductive filler material (II) is boron nitride.

9. The TCP resin composition according to claim 1, wherein the thermally conductive filler material (II) is a mixture of boron nitride (II-1) and aluminosilicate (II-2).

10. The TCP resin composition according to claim 1, wherein the matrix polymer (I) is an ABS resin.

11. The TCP resin composition according to claim 1, wherein the elastomeric block copolymer (I) is a linear styrene-butadiene block copolymer of the general structure S—(B/S)—S having, situated between the two styrene S blocks, one or more (B/S)-random blocks having random styrene/butadiene distribution.

* * * * *